(12) United States Patent
Wozniak et al.

(10) Patent No.: US 11,779,057 B2
(45) Date of Patent: Oct. 10, 2023

(54) HERB GRINDER

(71) Applicant: Rekt Inc., Laval (CA)

(72) Inventors: Artur Wozniak, Montreal (CA); Christopher Mennillo, Rosemere (CA)

(73) Assignee: Rekt Inc., Laval (CA)

( * ) Notice: Subject to any disclaimer, the term of this patent is extended or adjusted under 35 U.S.C. 154(b) by 0 days.

(21) Appl. No.: 16/257,756

(22) Filed: Jan. 25, 2019

(65) Prior Publication Data

US 2019/0150666 A1     May 23, 2019

Related U.S. Application Data

(63) Continuation-in-part of application No. 15/411,056, filed on Jan. 20, 2017, now abandoned.

(51) Int. Cl.
| | | |
|---|---|---|
| *A47J 42/34* | (2006.01) | |
| *A24B 7/00* | (2006.01) | |
| *A47J 42/20* | (2006.01) | |
| *A24F 47/00* | (2020.01) | |

(52) U.S. Cl.
CPC ................ *A24F 47/00* (2013.01); *A24B 7/00* (2013.01); *A47J 42/20* (2013.01); *A47J 42/34* (2013.01)

(58) Field of Classification Search
CPC .. A47J 42/14; A47J 42/20; A24B 7/00; B02C 25/00; B02C 18/18; B02C 18/144
USPC .......................................................... 241/88
See application file for complete search history.

(56) References Cited

U.S. PATENT DOCUMENTS

| | | | | |
|---|---|---|---|---|
| 8,733,679 | B2* | 5/2014 | Camitta | B02C 18/16 |
| | | | | 241/30 |
| 9,681,777 | B1* | 6/2017 | Dukat | A47J 42/14 |
| 2012/0168544 | A1* | 7/2012 | Chaoui | A47J 42/24 |
| | | | | 241/68 |
| 2014/0217213 | A1* | 8/2014 | Edwards | A47J 42/40 |
| | | | | 241/69 |
| 2014/0319249 | A1* | 10/2014 | Smith | A47J 43/25 |
| | | | | 241/24.1 |
| 2017/0128949 | A1* | 5/2017 | Takai | B02C 7/08 |

(Continued)

OTHER PUBLICATIONS

420ThreeD, Toothless Herb Grinder—by 420ThreeD. https://www.thingiverse.com/thing:1682040 (Year: 2016).*

(Continued)

*Primary Examiner* — Bobby Yeonjin Kim
(74) *Attorney, Agent, or Firm* — PRAXIS

(57) ABSTRACT

An herb grinder comprising a receptacle grinding for receiving herbs and an insertable grinding member for being inserted into the receptacle grinding member. The receptacle grinding member comprises a receptacle grinding surface and a peripheral wall structure circumscribing the receptacle grinding surface. The insertable grinding member comprises an insertable grinding surface for rotatably interfacing with the receptacle grinding surface. The grinding surfaces comprise define a respective plurality of elongate grooves forming a respective contiguous protruding structure therebetween. Impartment of a mutual rotational movement of the insertable member within the receptacle grinding member provides for grinding herbs between the interfacing grinding surfaces by the grinding action of the respective contiguous protruding structures thereof.

14 Claims, 9 Drawing Sheets

(56) References Cited

U.S. PATENT DOCUMENTS

2017/0164786 A1* 6/2017 Camitta .................. A24B 7/06

OTHER PUBLICATIONS

420ThreeD, 3D Printed Bamboo Shredder Demo 1. https://www.youtube.com/watch?v=6C7s6xwXy54 (Year: 2016).*
Stone Age Creations, LTD, "Products: Accents: Antique Millstone" (Year: 2014).*

* cited by examiner

HERB GRINDER

CROSS-REFERENCE TO RELATED APPLICATIONS

The present application is a continuation-in-parts application of U.S. patent application Ser. No. 15/411,056 filed on Jan. 20, 2017 and incorporated by reference herein in its entirety.

TECHNICAL FIELD

The present disclosure relates to an herb grinder.

BACKGROUND

In general, tobacco and botanical herb grinders are cylindrical devices divided into two halves with sharp pegs or teeth aligned such that when the halves are rotated with respect to each other, the material inside is shredded. Herb grinders are made from wood, plastic or metal, and may be manual or electric. They are commonly used for refining marijuana or tobacco, as well as in the kitchen for crushing spices and herbs. Prior art herb grinders include interchangeable and replaceable grinder plates that are secured with threading. The upper and lower grinding plates of are provided with blades having a modified diamond shape which for shredding the herbs and materials.

Herbs gets stuck in the teeth, pegs or blades and require cleaning. During grinding the herbs between the upper and lower teeth, pegs or blades sometimes cause blockage and resistance between the two cylindrical halves making the device ergonomically difficult or unattractive.

OBJECTS

An object of the present disclosure is an herb grinder.
An object of the present disclosure is to provide an herb grinder assembly.

SUMMARY

In accordance with an aspect of the present disclosure, there is provided a herb grinder comprising: a receptacle grinding member for receiving herbs therein and comprising a receptacle grinding surface and a peripheral wall structure circumscribing the receptacle grinding surface, the receptacle grinding surface defining a plurality of elongate grooves forming a contiguous protruding structure therebetween; and an insertable grinding member for being rotatably inserted into the receptacle grinding member comprising an insertable grinding surface for rotatably interfacing with the receptacle grinding surface, the insertable grinding surface defining a plurality of elongate grooves forming a contiguous protruding structure therebetween; wherein imparting a mutual rotational movement of the insertable member within the receptacle grinding member provides for grinding herbs between the interfacing grinding surfaces by the grinding action of the respective contiguous protruding structures thereof.

In accordance with an aspect of the present disclosure, there is provided a herb grinder assembly comprising: a tubular housing; a receptacle grinding member for receiving herbs therein and mountable to the tubular housing, the receptacle grinding member comprising a receptacle grinding surface and a peripheral wall structure circumscribing the receptacle grinding surface, the receptacle grinding surface defining openings and a plurality of elongate grooves forming a contiguous protruding structure therebetween; and an insertable grinding member for being rotatably inserted into the receptacle grinding member comprising an insertable grinding surface for rotatably interfacing with the receptacle grinding surface, the insertable grinding surface defining a plurality of elongate grooves forming a contiguous protruding structure therebetween; wherein imparting a mutual rotational movement of the insertable member within the receptacle grinding member provides for grinding herbs between the interfacing grinding surfaces by the grinding action of the respective contiguous protruding structures thereof, the openings of the receptacle grinding surface providing for the grinded herbs to pass therethrough into the tubular housing structure.

In an embodiment, the receptacle grinding member comprises a receptacle plate defining the receptacle grinding surface, the wall structure outwardly extending from the receptacle plate and defining an opening. In an embodiment, the receptacle plate defines the opening. In an embodiment, the insertable grinder member comprises an enclosure plate for enclosing the opening of the receptacle grinding member. In an embodiment, the enclosure plate rotatably engages the wall structure about the opening.

In an embodiment, the insertable grinding member comprises an insert structure for inwardly extending into the receptacle grinding member, the insert structure comprising the insertable grinding surface.

In an embodiment, the respective portions of the interfacing receptacle and insertable grinding surfaces are in mutual engagement. In an embodiment, the respective portions comprise respective magnets.

In an embodiment, the receptacle grinding surface comprises sets of the grooves, each of the sets comprising at least two of the grooves, the at least two of the grooves of a given one of the sets are parallel with each other. In an embodiment, the receptacle grinding surface comprises a circular configuration defining a diameter and a pair of circular halves at each side of the diameter, three of the sets formed on each of the circular halves, a given one of the three sets at one of the circular halves is offset and parallel to one of the three sets at the other of the circular halves.

In an embodiment, the elongate grooves comprise a concave configuration.

Other objects, advantages and features of the present disclosure will become more apparent upon reading of the following non-restrictive description of illustrative embodiments thereof, given by way of example only with reference to the accompanying drawings.

DETAILED DESCRIPTION OF ILLUSTRATIVE EMBODIMENTS

Generally stated and in accordance with an aspect of the present disclosure, there is provided there is provided an herb grinder comprising a receptacle grinding for receiving herbs and an insertable grinding member for being inserted into the receptacle grinding member. The receptacle grinding member comprises a receptacle grinding surface and a peripheral wall structure circumscribing the receptacle grinding surface. The insertable grinding member comprises an insertable grinding surface for rotatably interfacing with the receptacle grinding surface. The grinding surfaces comprise define a respective plurality of elongate grooves forming a respective contiguous protruding structure therebetween. Impartment of a mutual rotational movement of the insertable member within the receptacle grinding member provides for grinding herbs between the interfacing grinding surfaces by the grinding action of the respective contiguous protruding structures thereof.

The herb grinder of the disclosure is useful for grinding herbs, tobacco, marijuana and the like.

The disclosure provides an herb grinder that is relatively convenient to clean after use due to the lack of pegs and teeth.

The disclosure provides an herb grinder that provides for grinding herbs without the use of vertically aligned teeth or pegs to shred the herbs, instead the herb grinder provides grinding via the action such as compression of two textured hard interfacing grinding plates such as disks using friction instead of sharpness. The herb grinder of the present disclosure increases the rapidity, uniformity and fineness of the grinding. The disclosure broadens the use of the herb grinder, from simple tobacco to herbs and grains.

In this description, references to "top", "bottom", "upper", "lower" and the like merely refer to the relative positions of the elements and parts of the grinder in the figures, and do not restrict the positioning of the elements and parts in actual use.

Figure 1:
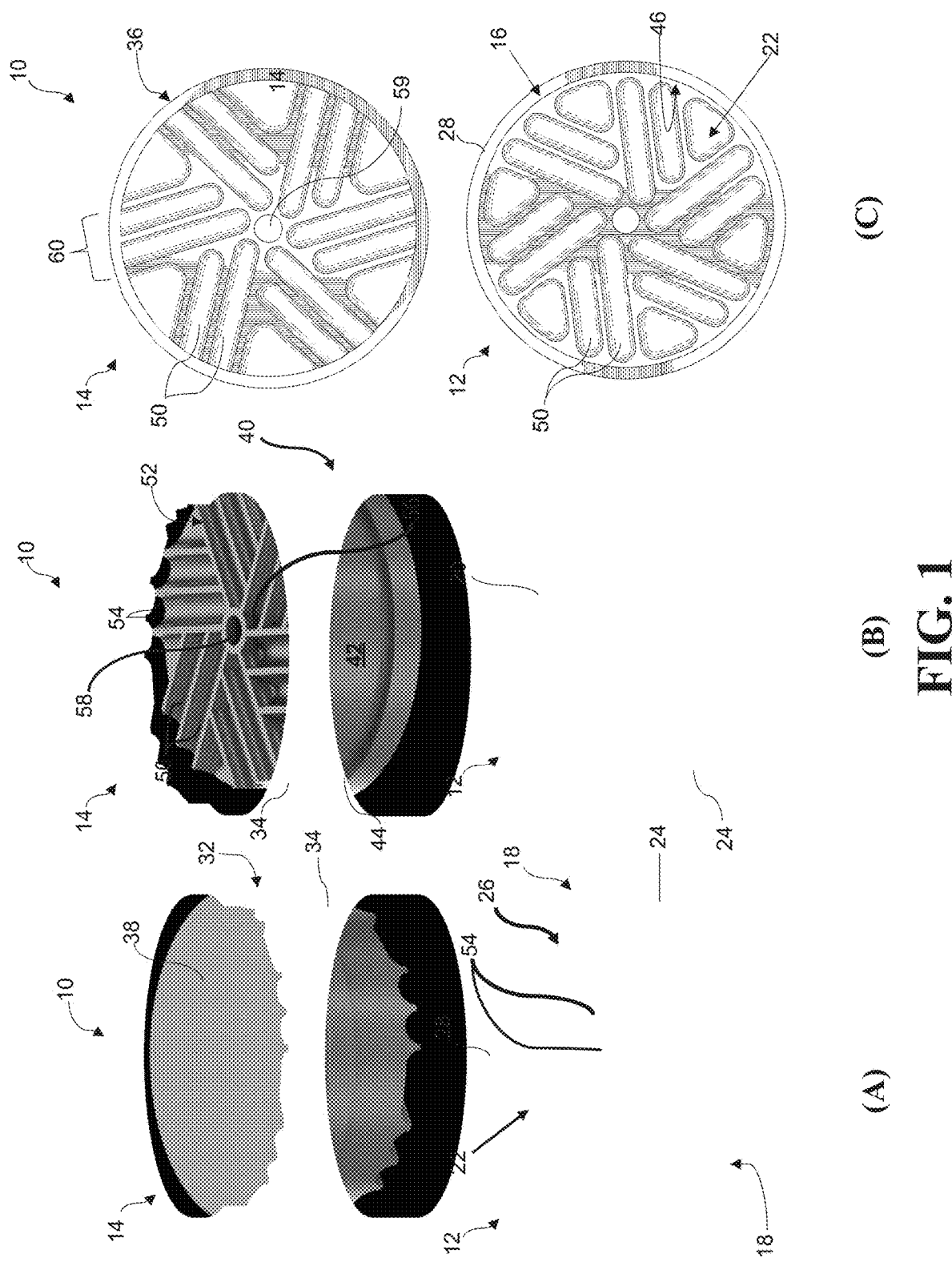
FIG. 1A is perspective view of the herb grinder showing the grinding members thereof in a disassembled position in accordance with a non-restrictive illustrative embodiment of the present disclosure.
FIG. 1B is a perspective underside view of the grinding members of the herb grinder of FIG. 1A position in accordance with a non-restrictive illustrative embodiment of the present disclosure.
FIG. 1C is a top plan view of the respective grinding surfaces of the herb grinding members of the herb grinder of FIG. 1A in accordance with a non-restrictive illustrative embodiment of the present disclosure.

With reference to FIGS. 1(A), 1(B), and 1(C) there is shown an herb grinder 10 comprising a receptacle grinder member 12 for receiving herbs therein and an insertable grinder member 14 for closing the opening 16 of member 12 and for being inserted therein. The insertion of the member 14 within member 12 can be partial or full.

As shown in FIGS. 1(A), 1(B), and 1(C), The receptacle grinder member 12 comprises a receptacle plate 18 defining a rear outer surface 20 and an inner grinding surface 22. A wall structure 24 outwardly extends from the plate 18 circumscribing the grinding surface 22 and defining with the grinding surface 22 an internal receiving area 26. The wall structure 24 extends from the plate 18 towards its edge 28 which defines a receptacle opening 30 providing access to the receiving area 26.

Figure 2:
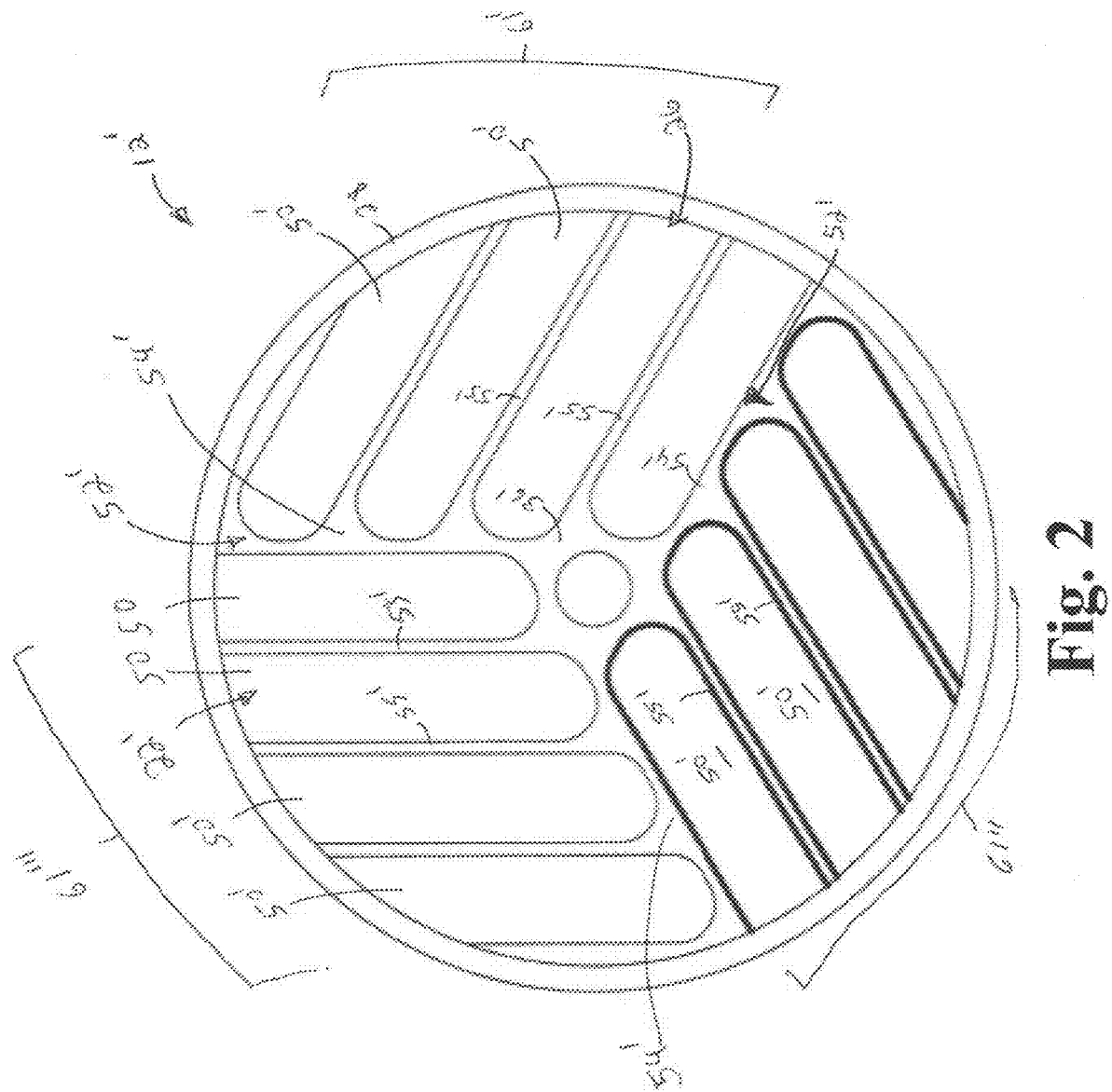
FIG. 2 is a plan view of a grinding surface of a lower grinding member of an herb grinder in accordance with another non-restrictive illustrative embodiment of the present disclosure.
Figure 4:
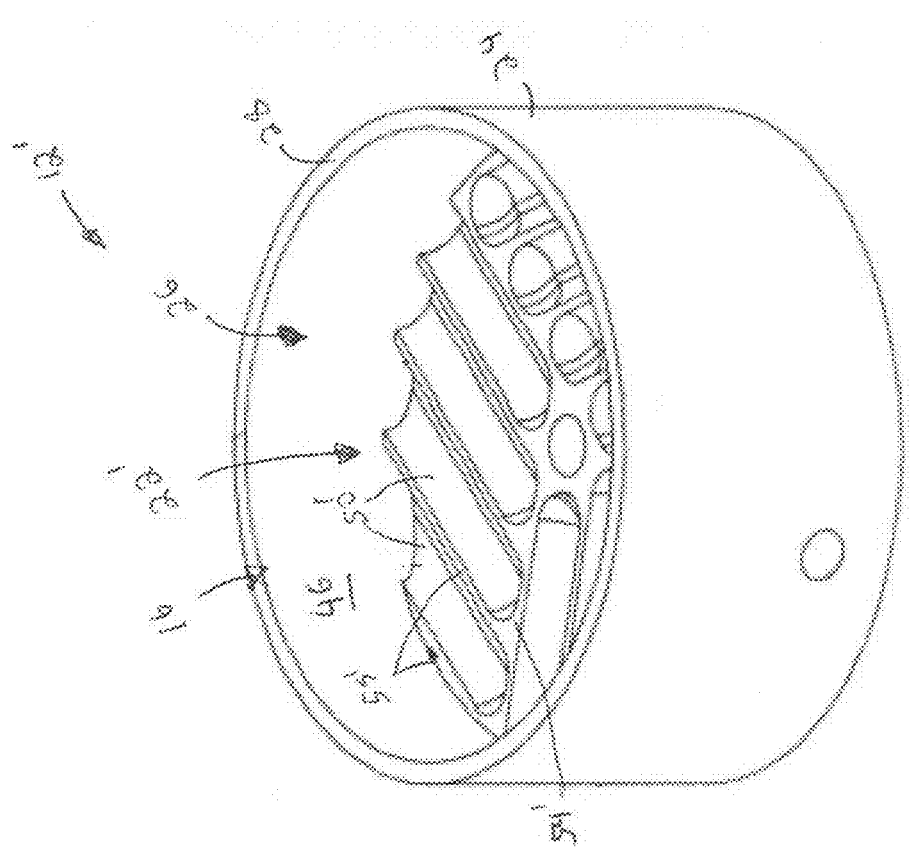
FIG. 4 is a perspective view of the grinding surface of the lower grinding member of FIG. 2.

With reference to FIGS. 2 and 4, there is shown a grinder member 12' similar to grinder member 12, with the main substantial difference being that its grinding surface 22' includes a grinding pattern that is different to the grinding pattern of grinding surface 22 as will be described herein.

As shown in FIGS. 1(A), 1(B), and 1(C) the insertable grinding member 14 comprises an enclosure plate 32 for enclosing the opening 30. An insert structure 34 outwardly extends from the plate 32 at one end thereof and defines a receptacle grinding surface 36 at another end thereof. The plate 32 defines an opposite outer face 38 and an inner face 40 which comprises the insert structure 34. The insert structure 34 defines an outer surface 42. The inner face 40 of the plate 32 forms a lip 44 circumscribing the outer surface 42 of the insert structure 34.

The lip 44 provides for rotatably engaging the edge 28 of the wall structure 24. The outer surface 42 rotates within area 26. In an embodiment, the outer surface 42 slidably engages in the inner surface 46 (see FIGS. 1(C) and 4) of the wall structure 24.

Figure 3:
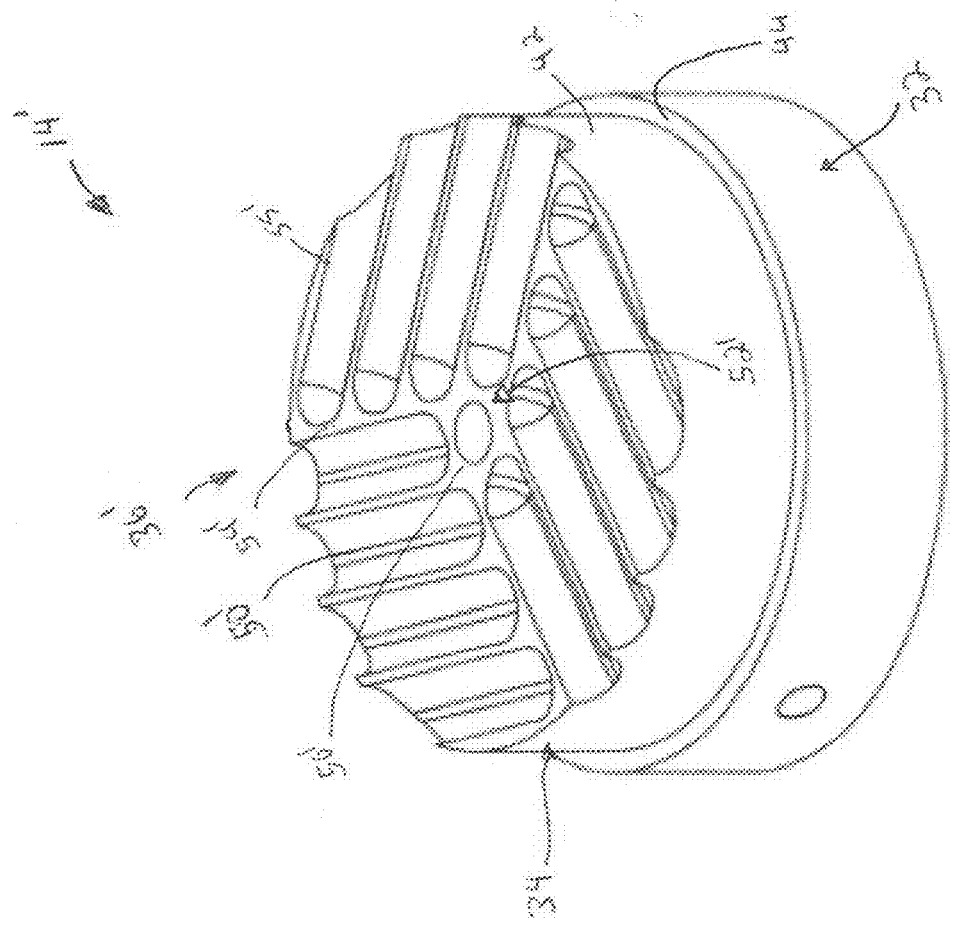
FIG. 3 a perspective view of the grinding surface of an upper grinding member of an herb grinder in accordance with another non-restrictive illustrative embodiment of the present disclosure.

With reference to FIG. 3, there is shown a grinder member 14' similar to grinder member 14, with the main substantial difference being that its grinding surface 36' includes a grinding pattern that is different to the grinding pattern of grinding surface 36 as will be described herein When the insertable grinder member 14 or 14' is mounted to the receptacle grinder member 12 or 12', the grinding surfaces 22 (or 22') and 36 (or 36') interface within one another and relative rotatable movement thereof provides for grinding herbs therebetween.

With reference to FIGS. 1(A), 1(B), and 1(C), the grinding surfaces 22 and 36 have the same pattern, with each grinding surface 22 and 36 defining a respective plurality of respective elongate grooves 50 forming a respective contiguous protruding structure 52 therebetween. The foregoing provides the appearance of a carved maze pattern.

The protruding structure 52 comprises interconnected contiguous elongate protrusion members 54 of varying sizes, each pair of adjacent elongate protrusion members 54 provide define an elongate groove 50 therebetween. In an embodiment, a protrusion member 54 has a convex configuration. In an embodiment, an elongate groove 50 has a concave configuration.

The protruding structure 52 of each grinding surface 22 and 36 comprises a central portion 56. The central portions 56 of each grinding surface 22 and 36 may be positioned in mutual engagement such a mutual magnetic engagement. In an embodiment, the central portion 56 defines a bore 58. In an embodiment, a magnetic element 59 is positioned within the bore 58.

Figure 7:
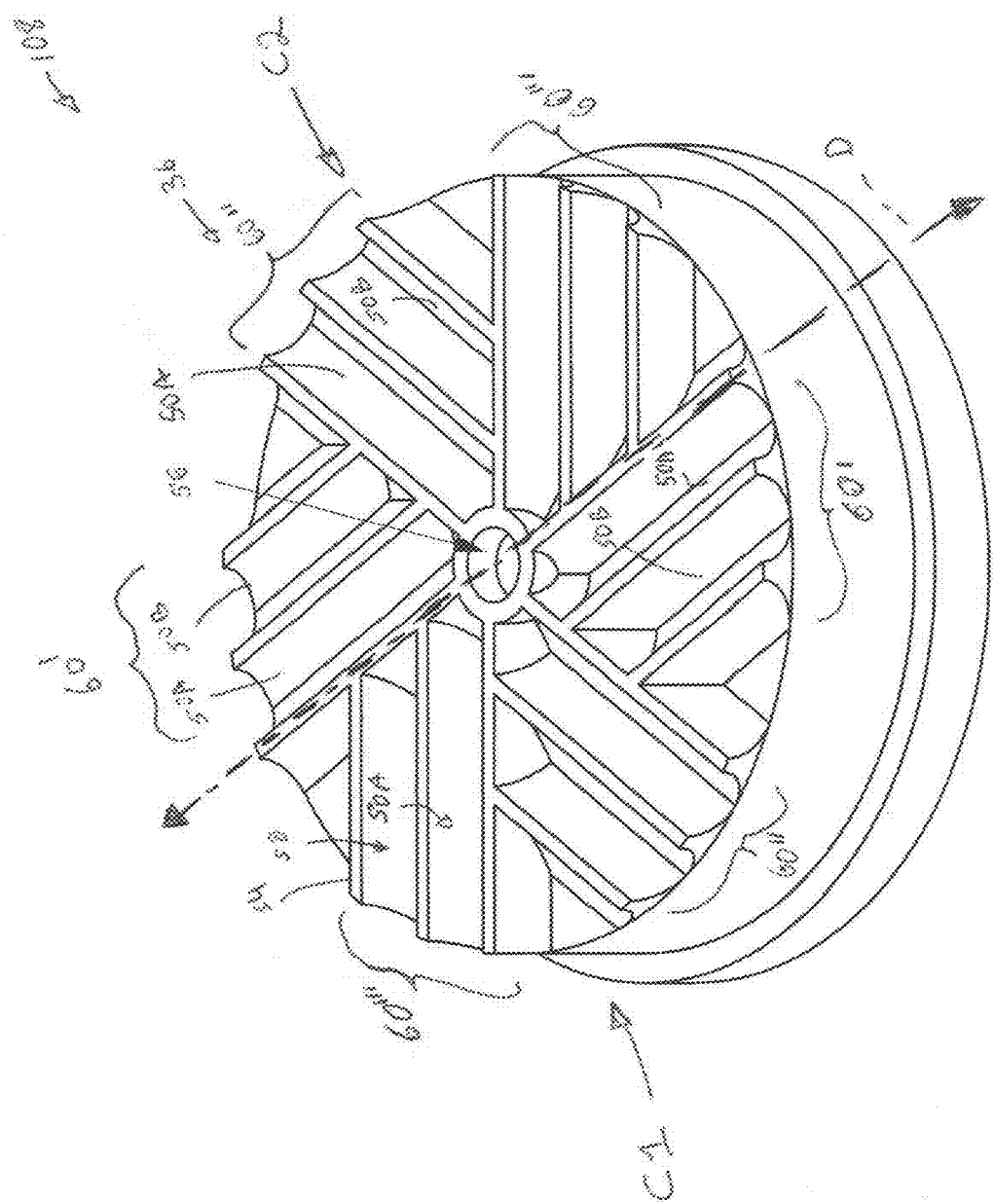
FIG. 7 is a perspective view of the grinding surface of the top insertable grinding member of the assembly of FIG. 6A in accordance with a non-restrictive illustrative embodiment of the present disclosure.

Turning to FIGS. 1C and 7, the grinding surface 36 comprises one or more sets 60 of grooves 50. In an embodiment, at least two grooves such as grooves 50A and 50B of a given set 60' are parallel with each other. In an embodiment, each or one of the grinding surfaces 22 and/or 26 comprises a circular configuration defining a diameter D and pair of circular halves C1 and C2 at each side of the diameter. In an embodiment, there are three sets 60', 60" and 60''' formed at each circular halve C1 and C2. In an embodiment, a given set 60', 60" and 60''' of one circular halve C1 or C2 is offset and parallel to a given one the sets 60', 60" and 60''' of the other circular halve C1 or C2. The foregoing applies to grinding surface 22 since the maze pattern of grinding surfaces 22 and 36 is similar as shown in FIG. 1(C).

Turning now to FIGS. 2, 3, and 4 the pattern of grinding surfaces 22' and 36' will now be described. Each grinding surface 22' and 36' comprises a plurality of elongate grooves 50' defining a protruding structure 52' therebetween. The protruding structure formed of a central portion 56', three main protruding members 54' radially extending therefrom, and four secondary protruding members 55' laterally extending from a respective main protruding member 54'. In this way, each grinding surface 22' and 36' provides for three sets 61', 61", 61''' of parallel grooves 50', with each set 61', 61", 61''' comprising four grooves 50.

Figure 5:
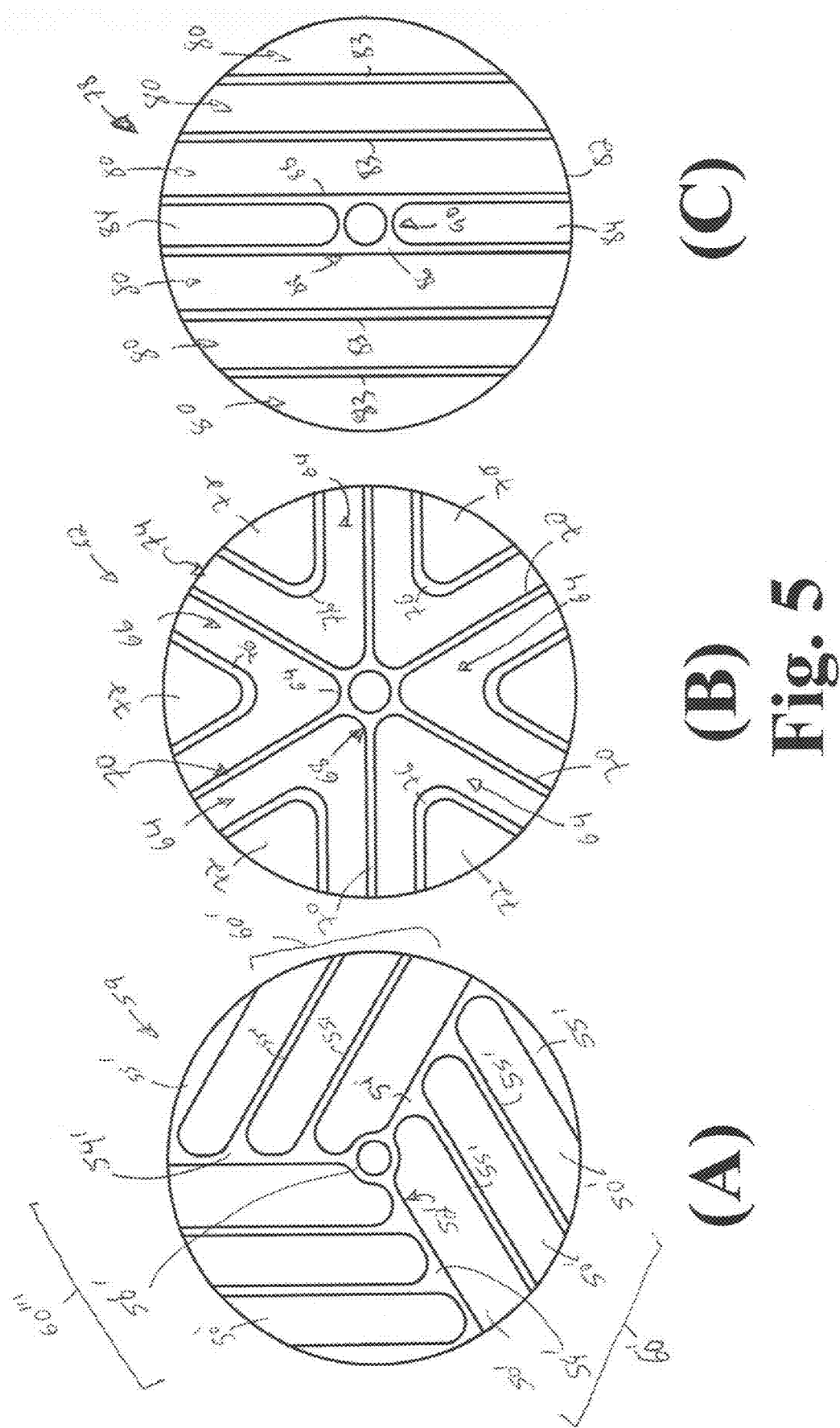
FIG. 5A is a plan view of a grinding surface of grinding member in accordance with another non-restrictive illustrative embodiment of the present disclosure.
FIG. 5B is a plan view of a grinding surface of grinding member in accordance with a further non-restrictive illustrative embodiment of the present disclosure.
FIG. 5C is a plan view of a grinding surface of grinding member in accordance with yet another non-restrictive illustrative embodiment of the present disclosure.

Referring to FIG. 5A, there is shown a circular grinding surface 59 which is similar to grinding surfaces 22' and 26' with the difference being that three secondary protruding members 55' laterally extend from each of the three main protruding members there by providing three sets of three parallel grooves 50'.

Referring to FIG. 5B, there is shown a circular grinding surface 62 defining a center 64 and comprising a plurality of V-shaped grooves 66 formed therein radially extending from a center 64 and defining a contiguous protruding structure 68 therebetween comprising radially extending protruding members 70, each protruding member 70 positioned between a pair of adjacent grooves 66. The surface includes peripheral triangular grooves 72 radially formed about the edge 74 of the grinding surface 62. A v-shaped protruding member 76 is defined between a given groove 66 and an adjacent groove 72.

Referring to FIG. 5B, there is shown a circular grinding surface 78 comprising a plurality of elongated parallel grooves 80 running from one side of the circular edge 82 to the opposite side thereof defining elongated protrusion members 83 therebetween running from one side of the circular edge 82 to the opposite side thereof. Two central grooves 84 are separated by a central portion 86 which is contiguous to a pair of elongate protrusion members 88 defining the grooves 84 therebetween. The central portion 86 and the pair of elongate protrusion members 88 define a contiguous protruding structure 90 between grooves 84 and the next adjacent grooves 80.

Either one or both of the grinding member 12 and/or 14 may comprise anyone of the grinding surfaces 22, 22', 36, 36', 59, 62 and/or 78 as well as like grinding surfaces within the context of the disclosure.

With reference to FIGS. 6(A), 6(B), 7, 8(A), 8(B), 8(C), 8(D), 9(A), 9(B), 9(C), 10(A) and 10(b) the herb grinder assembly 100 will now be described.

The grinder assembly 100 comprises an upper herb grinder 102 mounted to a tubular housing 104 comprising a bottom lid member 106. The herb grinder 102 comprises a top insertable grinder member 108 for being received by a first housing member 110. The top insertable grinding member 108 is similar to member 14 described herein and is shown in detail in FIG. 7 previously described.

Figure 6:
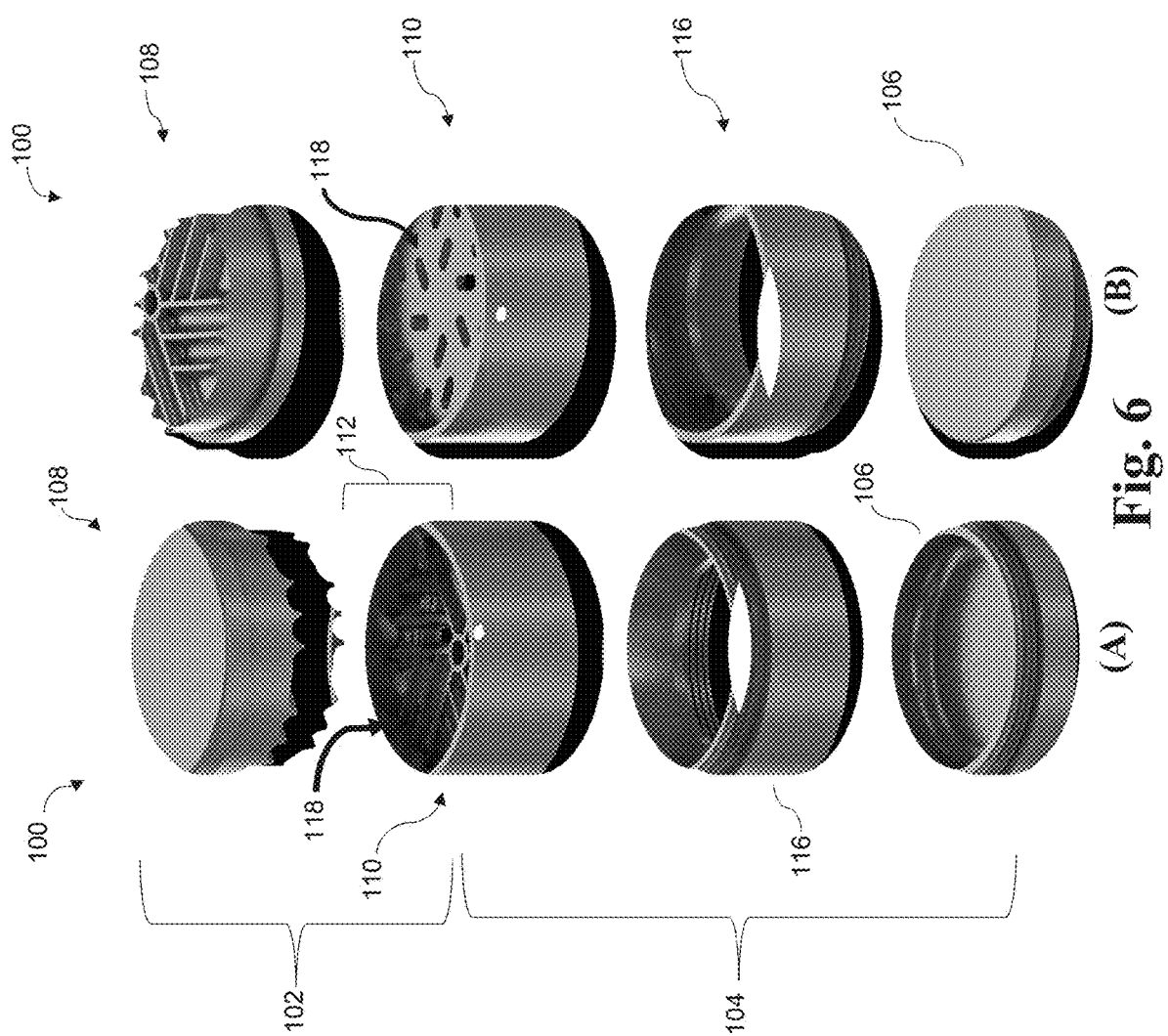
FIG. 6A is an exploded perspective view of an herb grinder assembly in accordance with a non-restrictive illustrative embodiment of the present disclosure.
FIG. 6B is an exploded perspective view of the herb grinder assembly of FIG. 6A showing the components thereof positioned in an opposite direction in accordance with a non-restrictive illustrative embodiment of the present disclosure.

With reference to FIGS. 6(A) and 6(B) The first housing member 110 comprises a top portion thereof defining a receptacle grinding part 112. The receptacle grinding part 112 is similar to the receptacle grinding member 12 with differences which will be described herein. The first housing member 110 comprises a bottom portion that defines a housing connector part 114 threadably mountable to a second housing member 116 (see FIGS. 6(A), 9(A), 9(B) and 9(C)). The first and second housing members 110 and 116 and the bottom lid member 106 define the tubular housing 104.

The receptacle grinding part 112 comprises a plate 118 defining the grinding surface 120 at top side 121 thereof and having apertures 122 formed therein in order to allow grinded herbs to pass therethrough into the housing connector part 114 and the second housing member 116. Grinding surface 120 is similar to grinding surface 22 previously described.

The top insertable grinding member 108 and the receptacle grinding part 112 are similarly interconnected as described for grinding members 12 and 14 and thus defining a first or grinding chamber therebetween.

Figure 8:
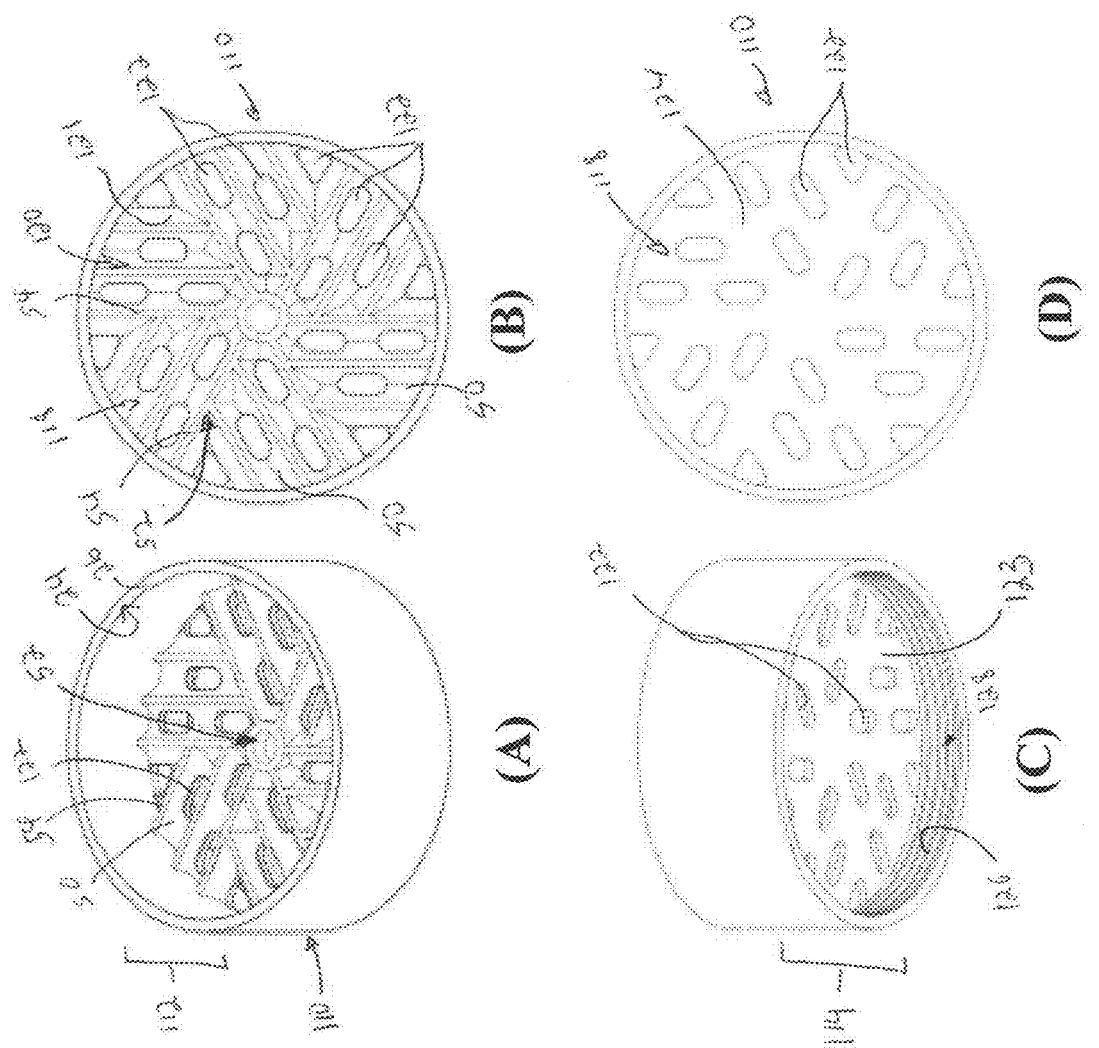
FIG. 8A is a top perspective side view of the first housing member of the assembly of FIG. 6A in accordance with a non-restrictive illustrative embodiment of the present disclosure.
FIG. 8B is a top plan view of the first housing member of FIG. 8A accordance with a non-restrictive illustrative embodiment of the present disclosure.
FIG. 8C is a bottom perspective side view of the first housing member of FIG. 8A accordance with a non-restrictive illustrative embodiment of the present disclosure.
FIG. 8D is a bottom plan view of the first housing member of FIG. 8A accordance with a non-restrictive illustrative embodiment of the present disclosure.
Figure 9:
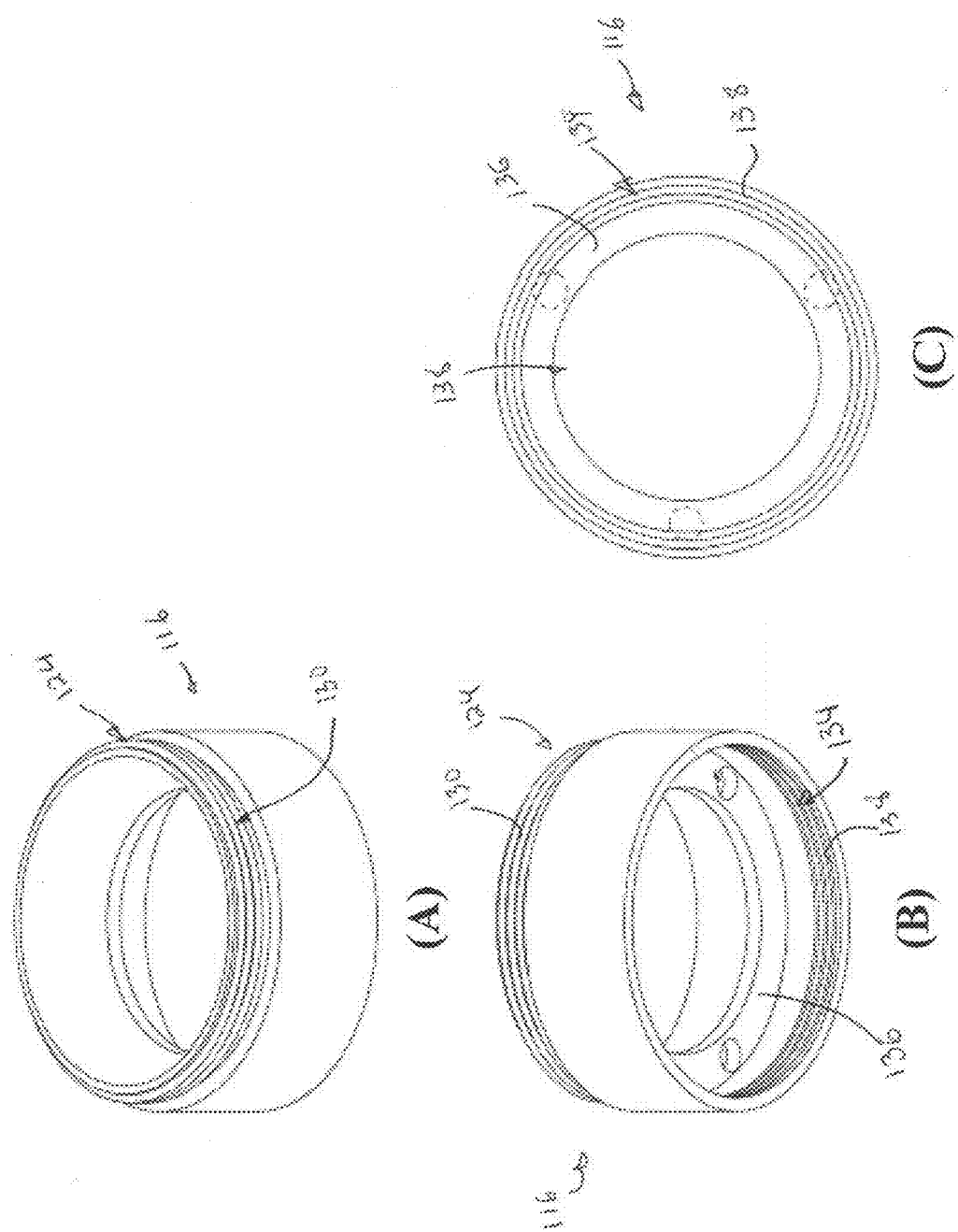
FIG. 9A is a top perspective side view of the second housing member of the assembly of FIG. 6A in accordance with a non-restrictive illustrative embodiment of the present disclosure.
FIG. 9B is a bottom perspective side view of the second housing member of FIG. 9A accordance with a non-restrictive illustrative embodiment of the present disclosure.
FIG. 9C is a bottom plan view of the second housing member of FIG. 9A accordance with a non-restrictive illustrative embodiment of the present disclosure.
Figure 10:
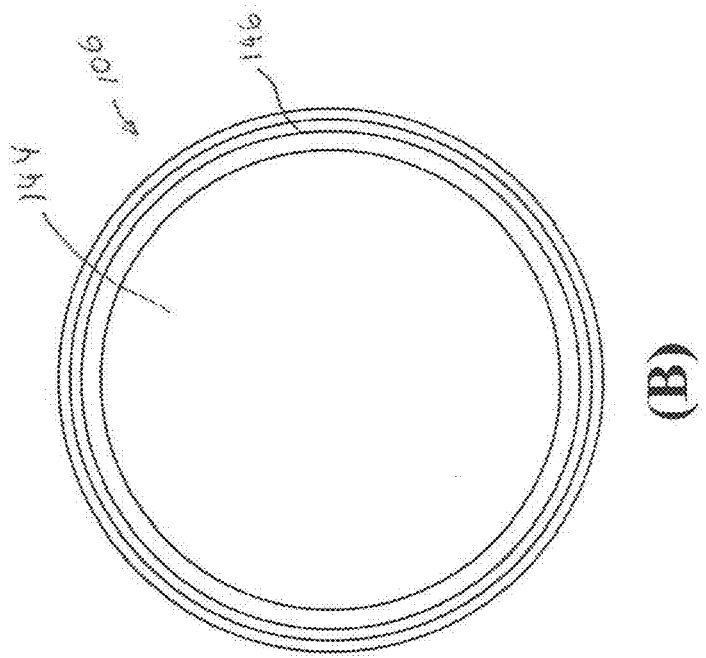
FIG. 10A is a top perspective side view of the bottom lid member of the assembly of FIG. 6A in accordance with a non-restrictive illustrative embodiment of the present disclosure.
FIG. 10B is a top plan view of the bottom lid member of FIG. 10A in accordance with a non-restrictive illustrative embodiment of the present disclosure.
Figure 10:
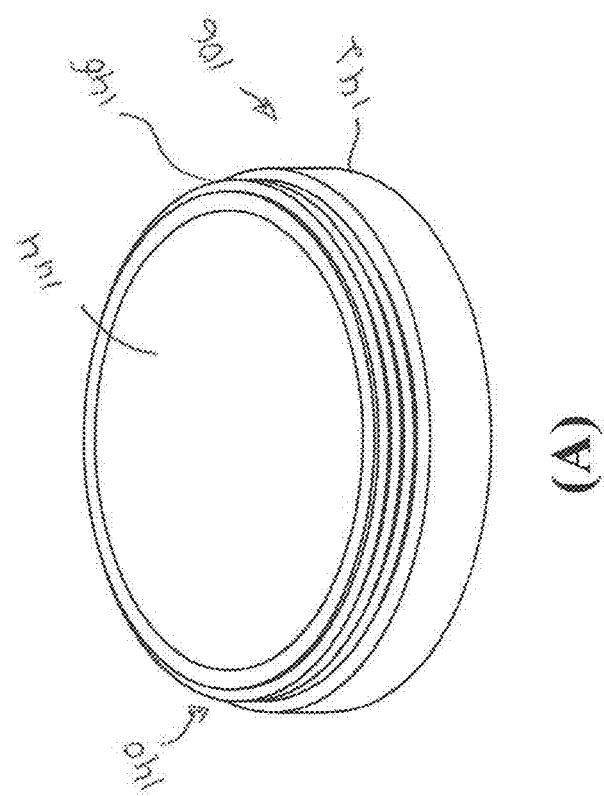

The housing connector part 114 defines a sleeve for receiving an upper portion 124 of the second housing member 116, as shown in FIGS. 9(A), 9(B) and 9(C). Accordingly and as shown in FIGS. 8(C) and 8(D), the housing connector part 114 comprises a bottom wall 126 extending from the underside 123 of the plate 118 and comprising inner thread elements 128 which provide for a mutual interference engagement fit with corresponding outer thread elements 130 (see FIGS. 9(A) and 9(B)) formed on the upper portion 124 of the second housing member 116.

Turning now to FIGS. 9(A), 9(B), 9(C), 10(A) and 10(B), the second housing member 116 comprises a lower portion 132 defining a sleeve 134 extending from a circular shoulder portion 136 circumscribing an opening 138. The sleeve 134 provides for receiving a neck portion 140 extending from the base plate 142 of the bottom lid member 106 and defining a floor 144. Accordingly, the sleeve 134 comprises inner threaded elements 138 which provide for a mutual interference engagement fit with corresponding outer thread elements 146 formed on the neck portion 140.

A second or grounded herb receiving chamber is formed between the underside 123 of the plate and the base plate 142 of bottom member 106.

When the herb grinder is assembled and the two grinding surfaces are interfaced, herbs are grounded when the grinding surfaces are rotated relative to each other by the cutting and abrasive action of the elongate protruding members of each grinding surface. The elongate protruding members provide for a continual sweeping-like cutting and abrading action with the herbs therebetween being sequentially trapped between a pair of spaced apart opposite elongate protrusions, a pair of spaced apart opposite elongate grooves and between a protrusion and opposite groove. The length of the protrusions interposed between grooves provides for easier rotational movement in comparison to separate tooth like or nail cutters which do not allow for a full grinding surface sweep. Thus the herbs find themselves between two grinding ridged surface structure which provide for a superior abrasive action as explained herein and as inherent in the structure thereof.

The various features described herein can be combined in a variety of ways within the context of the present disclosure so as to provide still other embodiments. As such, the embodiments are not mutually exclusive. Moreover, the embodiments discussed herein need not include all of the features and elements illustrated and/or described and thus partial combinations of features can also be contemplated. Furthermore, embodiments with less features than those described can also be contemplated. It is to be understood that the present disclosure is not limited in its application to the details of construction and parts illustrated in the accompanying drawings and described hereinabove. The disclosure is capable of other embodiments and of being practiced in various ways. It is also to be understood that the phraseology or terminology used herein is for the purpose of description and not limitation. Hence, although the present disclosure has been provided hereinabove by way of non-restrictive illustrative embodiments thereof, it can be modified, without departing from the scope, spirit and nature thereof and of the appended claims.

What is claimed is:

1. A handheld and manually operated herb grinder comprising:
    a handheld and manually operated receptacle grinding member for receiving herbs therein and comprising a receptacle grinding surface comprising wood, plastic or metal and a peripheral wall structure defining an inner surface thereof circumscribing the receptacle grinding surface, the receptacle grinding surface defining a plurality of first elongated grooves forming a first contiguous protruding structure therebetween, the first contiguous protruding structure defining a plurality of first elongated protrusion members, each of the first elongated protrusion members being interposed between two adjacent and parallel ones of the first elongated grooves; and
    a handheld and manually operated insertable grinding member being rotatably inserted into the receptacle grinding member, comprising a plate at one end thereof, an insertable grinding surface at an opposite end thereof, for rotatably interfacing with the receptacle grinding surface and an insert structure extending between the plate and the insertable grinding surface for inwardly extending into the receptacle grinding member and defining an outer wall surface for rotatably interfacing with the inner surface of the peripheral wall structure, the receptacle grinding surface comprising wood, plastic or metal, the insertable grinding surface defining a plurality of second elongated grooves forming a second contiguous protruding structure therebetween, the second contiguous protruding structure defining a plurality of second elongated protrusion members, each of the second elongated protrusion members being interposed between two adjacent and parallel ones of the second elongated grooves, each of the second elongated protrusion members being directly connected to the outer wall surface of the insert structure, the second elongated grooves comprise a respective pair of spaced apart vertical walls defining a floor therebetween, the floor having a concave curved configuration and defining together with the vertical walls a groove depth, a groove width is defined between the pair of spaced apart vertical walls above the floor, the vertical walls of adjacent ones of the grooves converge to define a respective one of the second elongated protrusion members, each of the second elongated protrusion members comprises a flat elongated grinding surface between the converging vertical walls running along the length thereof, the flat elongated grinding surface defining a width thereof between the converging walls;
    wherein the groove width is greater than the elongated grinding surface width and wherein the groove depth is greater than the elongated grinding surface width;
    wherein manually imparting a mutual rotational movement of the insertable member within the receptacle grinding member provides for grinding herbs between the interfacing grinding surfaces by the grinding action of the respective contiguous protruding structures thereof.

2. A herb grinder according to claim 1, wherein the receptacle grinding member comprises a receptacle plate defining the receptacle grinding surface, the peripheral wall structure outwardly extending from the receptacle plate and defining an opening.

3. A herb grinder according to claim 2, wherein the plate of the insertable grinding member provides for enclosing the opening of the receptacle grinding member.

4. A herb grinder according to claim 3, wherein the plate of the insertable grinding member rotatably engages the peripheral wall structure about the opening.

5. A herb grinder according to claim 1, wherein respective portions of the receptacle and insertable grinding surfaces are in mutual engagement.

6. A herb grinder according claim 1, wherein the receptacle grinding surface comprises sets of the first grooves, each of the sets comprising at least two of the first grooves, the at least two of the first grooves of a given one of the sets are parallel with each other.

7. A herb grinder according to claim 6, wherein the receptacle grinding surface comprises a circular configuration defining a diameter and a pair of circular halves at each side of the diameter, three of the sets formed on each of the circular halves, a given one of the three sets at one of the circular halves is offset and parallel to one of the three sets at the other of the circular halves.

8. A herb grinder assembly comprising:
a tubular housing;
a handheld and manually operated receptacle grinding member for receiving herbs therein and comprising a receptacle grinding surface comprising wood, plastic or metal and a peripheral wall structure defining an inner surface thereof circumscribing the receptacle grinding surface, the receptacle grinding surface defining a plurality of first elongated grooves forming a first contiguous protruding structure therebetween, the first contiguous protruding structure defining a plurality of first elongated protrusion members, each of the first elongated protrusion members being interposed between two adjacent and parallel ones of the first elongated grooves; and
a handheld and manually operated insertable grinding member being rotatably inserted into the receptacle grinding member, comprising a plate at one end thereof, an insertable grinding surface at an opposite end thereof, for rotatably interfacing with the receptacle grinding surface and an insert structure extending between the plate and the insertable grinding surface for inwardly extending into the receptacle grinding member and defining an outer wall surface for rotatably interfacing with the inner surface of the peripheral wall structure, the receptacle grinding surface comprising wood, plastic or metal, the insertable grinding surface defining a plurality of second elongated grooves forming a second contiguous protruding structure therebetween, the second contiguous protruding structure defining a plurality of second elongated protrusion members, each of the second elongated protrusion members being interposed between two adjacent and parallel ones of the second elongated grooves, each of the second elongated protrusion members being directly connected to the outer wall surface of the insert structure, the second elongated grooves comprise a respective pair of spaced apart vertical walls defining a floor therebetween, the floor having a concave curved configuration and defining together with the vertical walls a groove depth, a groove width is defined between the pair of spaced apart vertical walls above the floor, the vertical walls of adjacent ones of the grooves converge to define a respective one of the second elongated protrusion members, each of the second elongated protrusion members comprises a flat elongated grinding surface between the converging vertical walls running along the length thereof, the flat elongated grinding surface defining a width thereof between the converging walls;
wherein the groove width is greater than the elongated grinding surface width and wherein the groove depth is greater than the elongated grinding surface width;
wherein manually imparting a mutual rotational movement of the insertable member within the receptacle grinding member provides for grinding herbs between the interfacing grinding surfaces by the grinding action of the respective contiguous protruding structures thereof, the openings of the receptacle grinding surface providing for the grinded herbs to pass therethrough into the tubular housing structure.

9. A herb grinder assembly according to claim 8, wherein the receptacle grinding member comprises a receptacle plate defining the receptacle grinding surface and the openings, the peripheral wall structure outwardly extending from the receptacle plate and defining a wall opening.

10. A herb grinder according to claim 9, wherein the plate of the insertable grinding member provides for enclosing the opening of the receptacle grinding member.

11. A herb grinder assembly according to claim 10, wherein the plate of the insertable grinding member rotatably engages the peripheral wall structure about the opening.

12. A herb grinder assembly according to claim 8, wherein respective portions of the receptacle and insertable grinding surfaces are in mutual engagement.

13. A herb grinder assembly according claim 8, wherein the receptacle grinding surface comprises sets of the first grooves, each of the sets comprising at least two of the first grooves, the at least two of the first grooves of a given one of the sets are parallel with each other.

14. A herb grinder assembly according to claim 13, wherein the receptacle grinding surface comprises a circular configuration defining a diameter and a pair of circular halves at each side of the diameter, three of the sets formed on each of the circular halves, a given one of the three sets at one of the circular halves is offset and parallel to one of the three sets at the other of the circular halves.

* * * * *